(12) United States Patent  
Godshaw et al.

(10) Patent No.: US 7,534,041 B2  
(45) Date of Patent: May 19, 2009

(54) FOLDING BAG CONSTRUCTION

(75) Inventors: Donald E. Godshaw, Evanston, IL (US); Andrezj M. Redzisz, Wheeling, IL (US)

(73) Assignee: Travel Caddy, Inc., Elk Grove Village, IL (US)

( * ) Notice: Subject to any disclaimer, the term of this patent is extended or adjusted under 35 U.S.C. 154(b) by 548 days.

(21) Appl. No.: 11/150,505

(22) Filed: Jun. 10, 2005

(65) Prior Publication Data

US 2005/0238261 A1    Oct. 27, 2005

Related U.S. Application Data

(63) Continuation-in-part of application No. 10/758,058, filed on Jan. 15, 2004, now Pat. No. 7,163,340.

(51) Int. Cl.
| | |
|---|---|
| B65D 30/10 | (2006.01) |
| B65D 33/14 | (2006.01) |
| B65D 30/22 | (2006.01) |
| B65D 33/24 | (2006.01) |
| B65D 33/02 | (2006.01) |
| B65D 30/00 | (2006.01) |
| A45C 7/00 | (2006.01) |
| A01K 1/02 | (2006.01) |
| A01K 1/03 | (2006.01) |

(52) U.S. Cl. ................ 383/121; 383/22; 383/40; 383/84; 383/119; 383/121.1; 190/107; 119/474; 119/498

(58) Field of Classification Search ............. 383/121, 383/121.1, 67, 41, 119, 97, 84, 86, 22; 190/107; 119/453, 474, 497  
See application file for complete search history.

(56) References Cited

U.S. PATENT DOCUMENTS

| | | | | | |
|---|---|---|---|---|---|
| 1,633,991 | A | * | 6/1927 | Lifton | 190/115 |
| 4,136,726 | A | * | 1/1979 | Lee | 206/316.2 |
| 4,676,416 | A | * | 6/1987 | Harmon | 224/407 |
| 4,810,102 | A | * | 3/1989 | Norton | 383/4 |
| 4,923,060 | A | * | 5/1990 | Breslau | 206/316.2 |
| 6,068,402 | A | * | 5/2000 | Freese et al. | 383/110 |
| 6,409,076 | B1 | * | 6/2002 | Wang | 229/122.34 |
| 6,920,993 | B2 | * | 7/2005 | Sheng-Bin | 220/6 |
| 7,163,340 | B2 | * | 1/2007 | Godshaw et al. | 383/121 |
| 2008/0237071 | A1 | * | 10/2008 | Campillo et al. | 206/292 |

FOREIGN PATENT DOCUMENTS

JP    11180436 A    *    7/1999

* cited by examiner

*Primary Examiner*—Jes F Pascua  
(74) *Attorney, Agent, or Firm*—Banner & Witcoff, Ltd.

(57) ABSTRACT

A folding bag has a generally rectangular parallelepiped shape with rigid lateral front and backsides and a flexible bottom panel with a diagonal slit that enables folding of the bag into a compact flat configuration. A rigid folding panel is provided on the inside of the bag to enable maintenance of the bottom side in a generally fixed configuration and to maintain the shape of the bag.

22 Claims, 14 Drawing Sheets

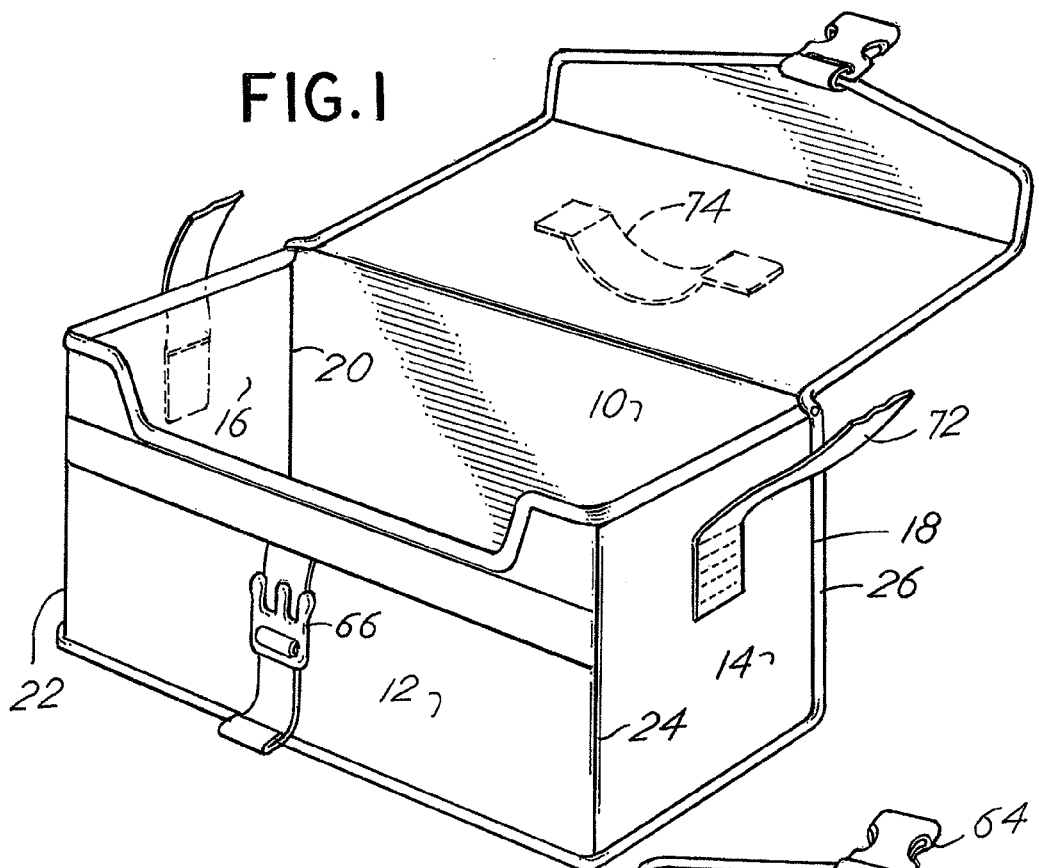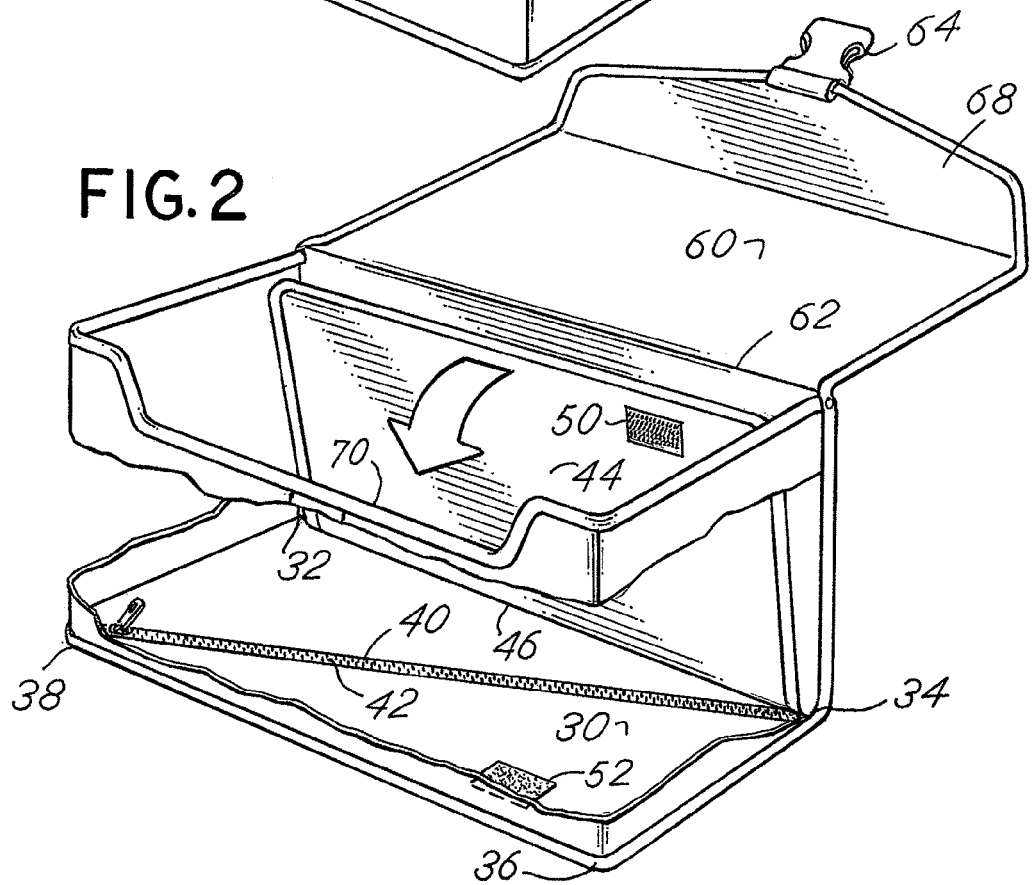

FOLDING BAG CONSTRUCTION

CROSS REFERENCE TO RELATED APPLICATION

This is a continuation-in-part application of Ser. No. 10/758,058 filed Jan. 15, 2004 entitled "Folding Bag Construction" for which priority is claimed and which is incorporated herewith by reference with respect to the common subject matter thereof.

BACKGROUND OF THE INVENTION

In a principal aspect, the present invention relates to a generally parallelepiped bag construction having generally rigid side panels and a flexible bottom panel to enable the bag to be folded for purposes of storage, shipment and display, yet assembled in a rigid form for use as a tool bag or the like.

The use of bags, particularly generally parallelepiped bags, for tools by workmen, for craftsmen, for sportsmen and others to carry their gear and things is a well-known expedient. Typically, such bags include lateral sides and bottom with a top cover that enables protection of the contents of the bag. Preferably, the lateral sides and the bottom side of the bag are rigid or stiff so as to further protect the contents and facilitate movement and carrying of such a bag.

However, the storage of such bags, as well as the packaging and shipping of such bags, requires significant amounts of space inasmuch as the internal portion of the bag is generally empty. Thus, a bag which is comprised of generally rigid panels in a parallelepiped form can be costly to store, ship and display.

To overcome such disadvantages, soft-sided bags have been developed. Thus, a bag having a generally rigid bottom panel and soft lateral sides may be folded for purposes of storage, transport, display and the like. However, with such a construction, the soft sides of the bag do not provide the type of protection and physical integrity to protect the contents of the bag once the bag is in use. Thus, there has developed the need for a folding bag constructed of multiple, generally rigid lateral sides and a connected bottom side.

BRIEF SUMMARY OF THE INVENTION

Briefly, the present invention comprises a folding bag having a generally rectangular parallelepiped configuration wherein all the sides of the bag, except the bottom side, may be formed of generally rigid panels connected by flexible hinges. The bottom side is made from a flexible material and includes a zipper opening or slit connecting diagonal corners of the bottom side. In one embodiment, positioned within the bag and along a seam joining one of the lateral sides to the bottom side, a rigid panel is provided. The panel may be folded against the bottom side or folded away from the bottom side. Thus the bag, when folded for storage, requires that the zipper opening be released so that the flexible bottom side may be folded as the rigid bottom panel attached thereto may be folded away from the bottom side and the lateral sides may be collapsed upon one another. The bag will then have a flat configuration wherein all of the sides are folded upon one another for purposes of storage, shipping and later assembly. Assembly is simplified inasmuch as the bag is merely unfolded to enable closing the zipper slot in the bottom side, and the rigid bottom panel is folded down over the bottom side into position to maintain the parallelepiped configuration of the bag. The folding bag further optionally includes a hinged top side which may be closed and retained by a clasp or fastener mechanism.

An alternative embodiment is useful as an animal carrier, among other purposes, and may be easily attached to and supported by a bar or rod, for example, the handlebar of a bike. The alternative embodiment also employs an alternative stiffening arrangement for the bottom side of the carrier bag, namely, a stiffening rod is inserted into pockets aligned on opposite sides of the diagonal slit in the bottom side.

Thus, it is an object of the invention to provide a folding, rigid sided bag.

It is a further object of the invention to provide a folding rigid sided bag wherein the bottom panel of the bag is flexible and includes a diagonal slit connecting non-adjacent corners of the bag.

Yet another object of the invention is to provide a folding bag which may be used as a tool bag, a sport bag, or for any other purpose wherein the bag has a generally rectangular parallelepiped configuration when assembled for use.

A further object of the invention is to provide a folding bag comprised of generally rigid lateral sides and a flexible bottom side with a folding bottom panel which is generally rigid and congruent with the bottom side.

Another object of the invention is to provide a folding bag construction which is easy to assemble, inexpensive, rugged and which enables maintenance of the contents of the bag when in an assembled condition to be easily protected.

A further object of the invention is to provide alternate means for maintaining the bag in an open or unfolded carry bag configuration.

Another object of the invention is to provide a means to support the bag on a bar such as a bicycle handlebar.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is an isometric view of a preferred embodiment of the folding bag of the invention wherein the bag is in a fully assembled condition;

FIG. 2 is a cut-away, isometric view of the bag of FIG. 1 illustrating the manner of assembly and disassembly of the bag between the open or ready-to-use condition and the storage or folded condition;

DESCRIPTION OF THE PREFERRED EMBODIMENTS

Figure 3:
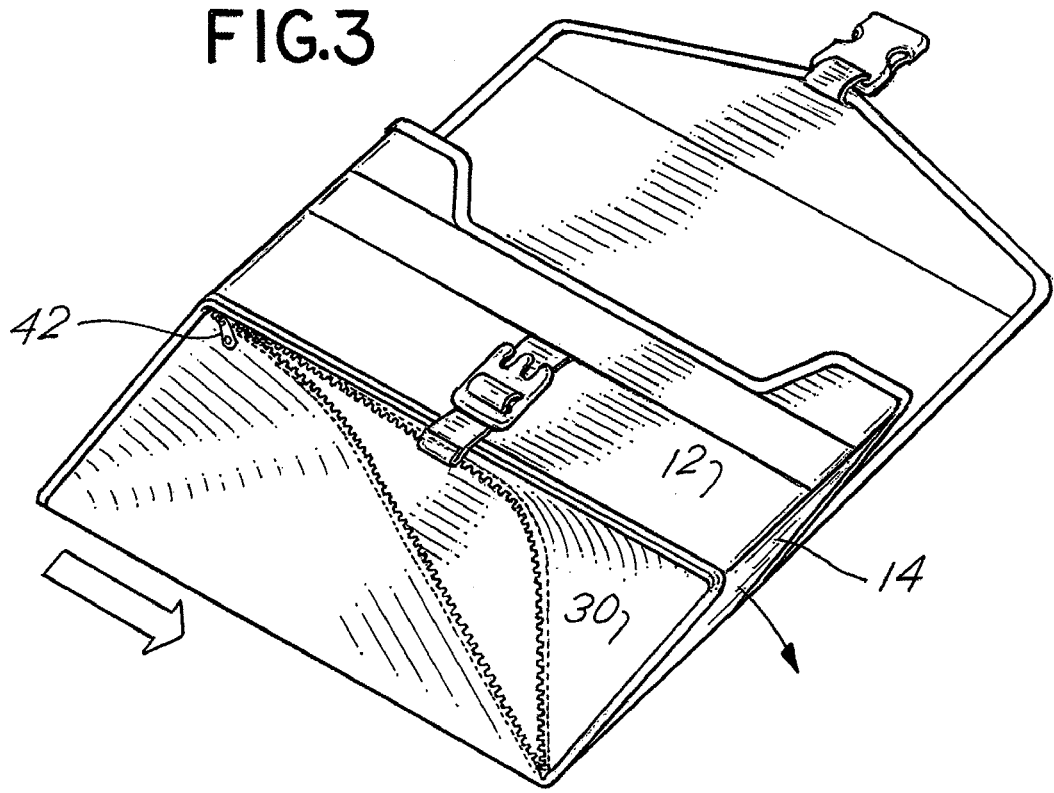
FIG. 3 is an isometric view depicting the bag of FIG. 2 from the opposite or bottom side thereof and further depicting the manner in which the rigid bottom panel of the bag may be positioned for folding of the bag.

Referring to the figures, a generally rectangular parallelepiped bag includes a generally rigid back side 10, a generally rigid, parallel, front side 12, a first generally rigid, lateral side 14 and a spaced generally parallel, rigid second lateral side 16. Each of the sides 10, 12, 14 and 16 are attached sequentially one to the other along flexible seams such as seams 18, 20, 22, and 24. In practice, the panels or sides 10, 12, 14 and 16 may, for example, comprise a polyethylene board enclosed in a fabric sleeve wherein the polyethylene board forms each of the separate sides 10, 12, 14 and 16 and the sleeve encloses or enshrouds each of the sides 10, 12, 14, 16 and connects to form the flexible seams 18, 20, 22 and 24. Cording or ribbing, such as ribbing 26, may be used to connect the fabric seams.

The folding bag further includes a generally rectangular bottom side 30. The bottom side 30 is comprised of flexible material such as plastic, canvas or the like. The bottom panel 30 includes four corners 32, 34, 36, and 38. A diagonal slit 40 connects non-adjacent corners 34 and 38. The slit 40 includes a zipper device 42 which enables opening and closing of the slit 40.

A rigid bottom panel 44 is attached to a seam 46 which permits the panel 44 to pivot as a flexible hinge. Bottom panel 44 is generally congruent in size and shape with the bottom side 30. Thus, the panel 44 which may, for example, comprise a generally rigid polyethylene board encapsulated or enclosed in a fabric sleeve. Panel 44 may be folded about the seam 46 against the bottom side 30 to provide for maintenance of the form and shape of the bottom side 30 and the bag due to engagement of the sides of panel 44 against lateral sides 10, 12, 14 and 16. The bottom panel 44 may, for example, also incorporate fasteners, such as Velcro fasteners 50, which engage with a Velcro fastener 52, by way of example, on the inside, bottom side 30 to hold or retain the panel 44 in position against the bottom side 30 thereby maintaining the shape and configuration of the folding bag.

Figure 4:
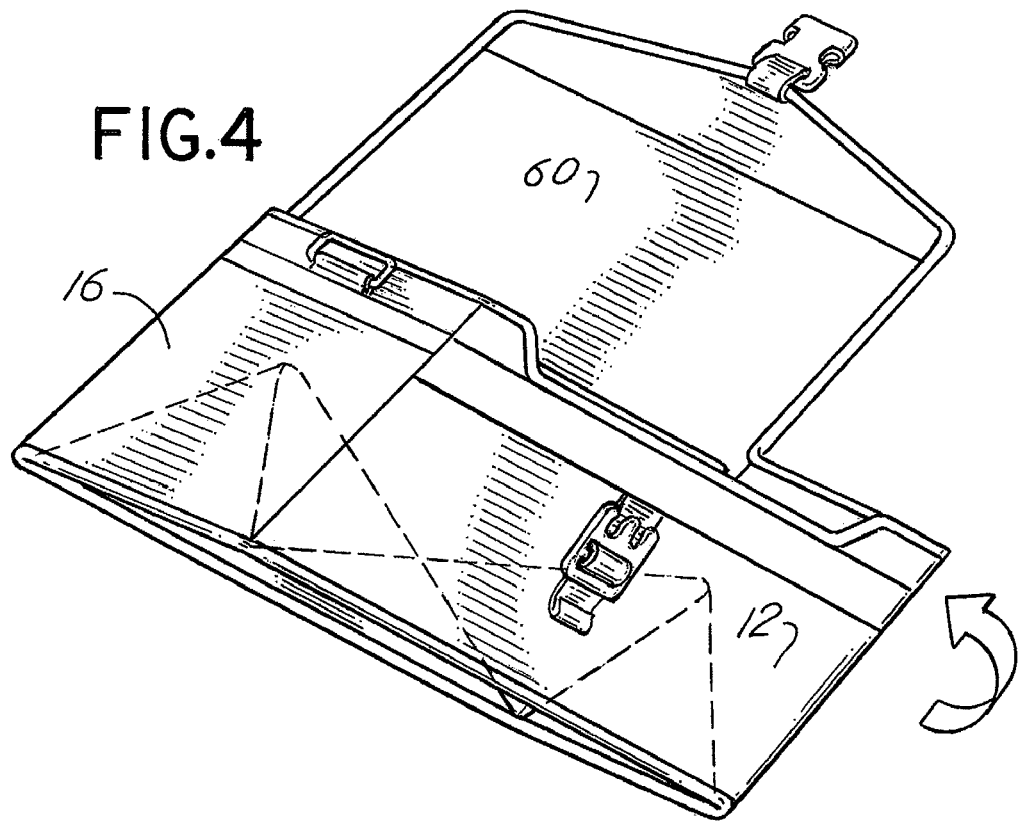
FIG. 4 is an isometric view of the bag of FIG. 1 in the folded condition.

Thus, when assembling the folding bag to the condition depicted in FIG. 1, the bottom panel 44 will be folded in the direction of the arrow in FIG. 2 to engage against the bottom side 30. By so engaging against the bottom side 30 and due to the fact that all of the sides 10, 12, 14, 16, except for the bottom side 30, are generally rigid, a generally rigid bag results in the assembled condition as depicted in FIG. 1. Of course, reversing the process by releasing the bottom panel 44 from the bottom side 30, enables folding of the bag once the zipper 42 is opened. Thus, as depicted in FIG. 3, when the zipper 42 is opened, because the bottom side 30 is flexible, the sides 10, 12, 14, 16 of the bag may be folded about their various flexible hinges 18, 20, 22 and 24 to the configuration depicted in FIG. 4. Thus, all of the sides 10, 12, 14, and 16, the bottom panel 44 may all be folded into a flat configuration inasmuch as the bottom side 30 is flexible and due to the diagonal slot 40 which enables folding thereof by movement of those sides in the manner depicted by the arrow in FIG. 3. Note that the slit or slot 40 enables folding in the direction of the arrow only.

The folding bag construction of the invention may further include a top side 60 foldable about a flexible seam 62. The top side 60 may thus be flexible or generally rigid having a construction similar to the other sides previously described. The top side 60 may then be folded about the seam or flexible hinge section 62 to close the bag. A clasp or fastener 64 on the top side may be engaged with a compatible clasp 66 attached to the front side 12. The top side 60 may also include an extra flap section 68 to insure that the top side 60 will be retained over the open top of the bag. Additionally, the front side 12 may include a recessed forward section 70, in FIG. 2, which will facilitate access to the bag. The particular shape and configuration of the front side 12, thus, may be varied to accommodate desired needs and utility of the bag. A strap 72 may be provided connecting the lateral sides 14 and 16. A carry handle 74 may be provided on the outside of the top side 60 again for carrying the bag.

In practice, then each of the generally rigid panels forming the sides 10, 12, 14 and 16 as well as the top side 60 may comprise a material board retained with a fabric sleeve. Importantly, however, the bottom side 30 is a flexible material such as fabric, plastic, canvas or the like. Also importantly, the diagonal slot 40 extends between non-adjacent corners of the bottom side 30.

FIGS. 5-19 illustrate a second or alternative embodiment of the invention especially useful as an animal carrier wherein the animal carrier includes means for supporting the carrier or bag from a bar such as the handle bar of a bicycle. Thus, the bag depicted in these figures is a generally rectangular parallelepiped bag construction including a front side or front panel 100, a first lateral side or panel 102, a back side panel 104 and an opposite or second lateral side panel 106. Typically, each of the panels 100, 102, 104, 106 is made from a flexible fabric material and includes an upper circumferential rim or rib 108 which may include stiffening members to facilitate maintenance of the form of the bag in the open condition as illustrated, for example, in FIG. 5. Thus, the rim 108 may be comprised of a tubular fabric member 110 with horizontal stiffening members for each side, such as stiffening member 112 associated with the side 102 and a second stiffening member 114 associated with the backside panel 104. The front side panel 100 and the second lateral side panel 106 may comprise a similar construction.

Figure 11:
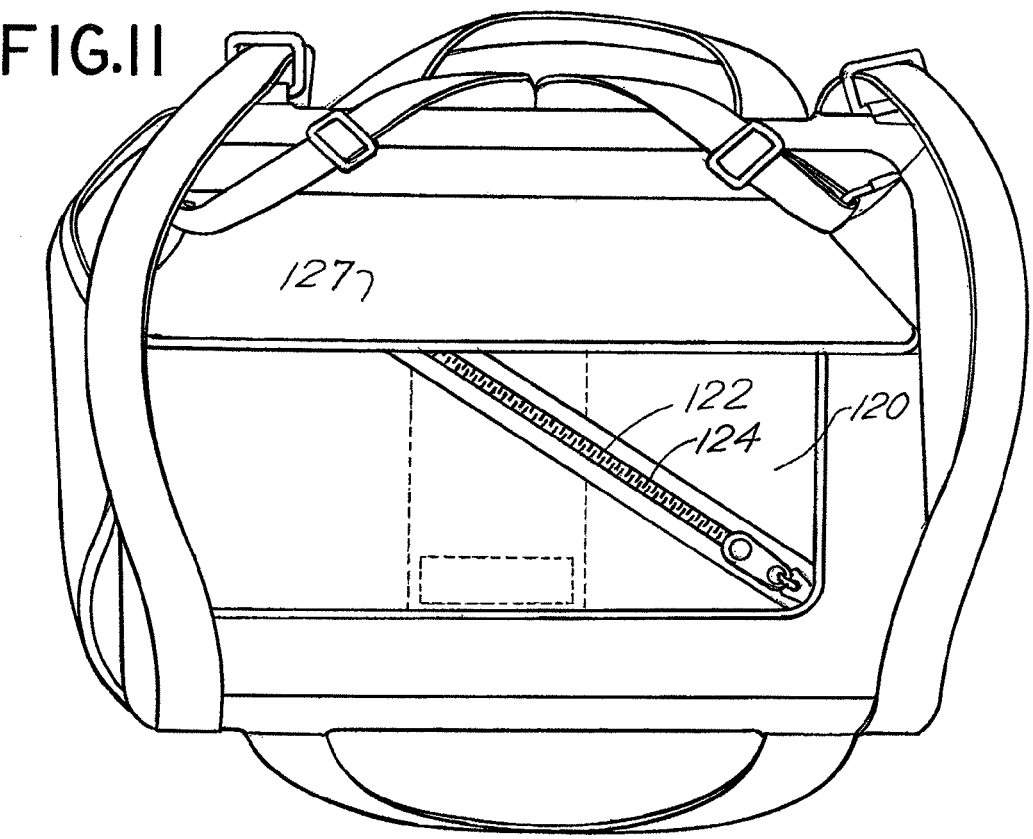
FIG. 11 is a bottom plan view of the bag of FIG. 5.

Each of the front, lateral side and back panels are flexibly connected and attached to a bottom side panel, 120, for example, in FIG. 11. The bottom side panel 120 includes a diagonal slit 122 with a zipper fastener 124 that permits opening and closing of the slit 122. A cover panel 127 may optionally be included to cover the zippered slit 122 when the zipper is in the closed condition as for example illustrated in FIG. 11. The cover 127 may be held in position over the zippered bottom panel 120 by means of a hook and loop fastener, for example.

Figure 5:
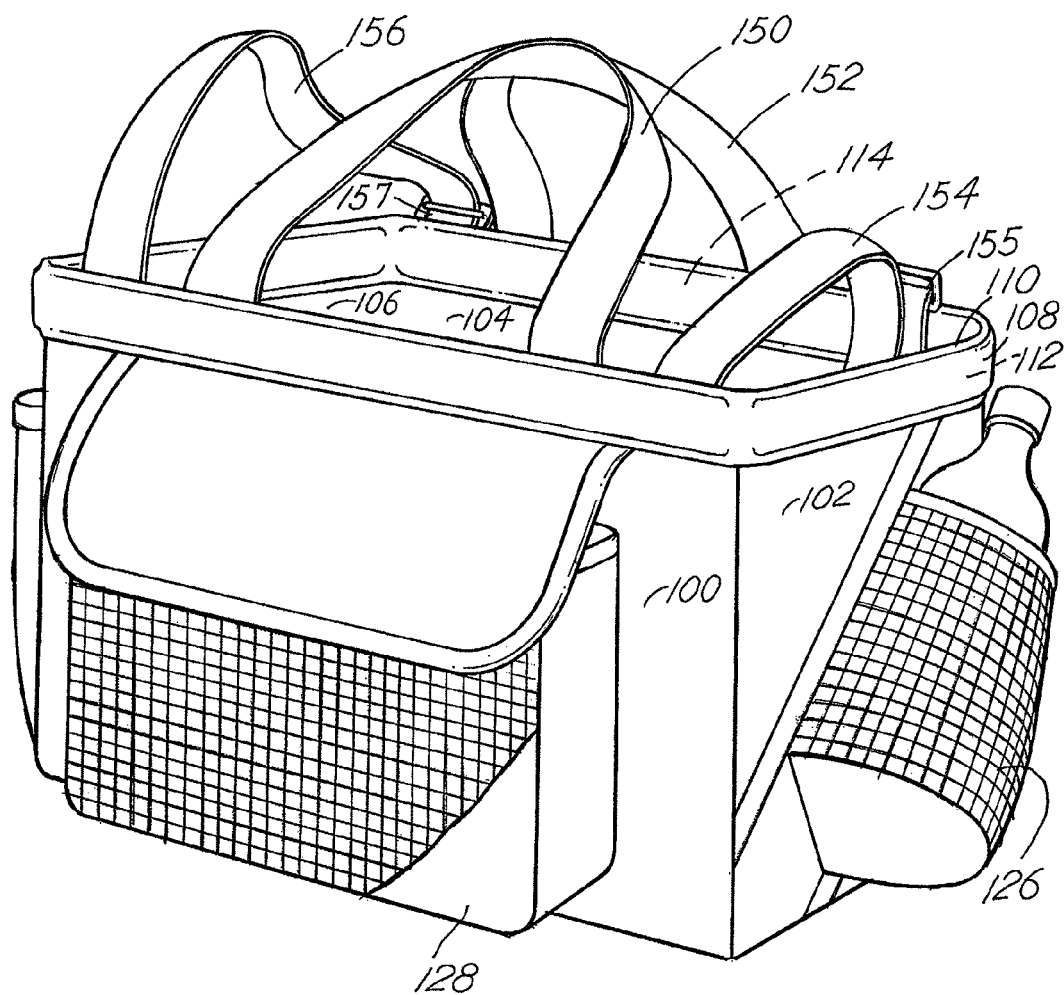
FIG. 5 is an isometric view of a second embodiment of the invention especially useful as an animal carrier suspended, for example, from a bicycle handlebar.

Each of the panels 100, 102, 104, 106 and 120 are connected together to form a generally open top, rectangular parallelepiped bag. Optional pockets such as water bottle pocket 126 and storage pocket 128 on front panel 100 may be included for storage of items on the outside of the bag. The joints or joinder lines connecting each of the panels are generally flexible so that upon unzipping of the zipper 124 to create slit 122, the bag may be folded to the configuration depicted in FIGS. 13 and 14 for purposes of storage, for example. Forming the bag, as depicted in FIG. 5, enables closing of the zipper 124 and thus closing of the slit 122 to thereby facilitate maintaining the bag in its rectangular parallelepiped form.

Figure 6:
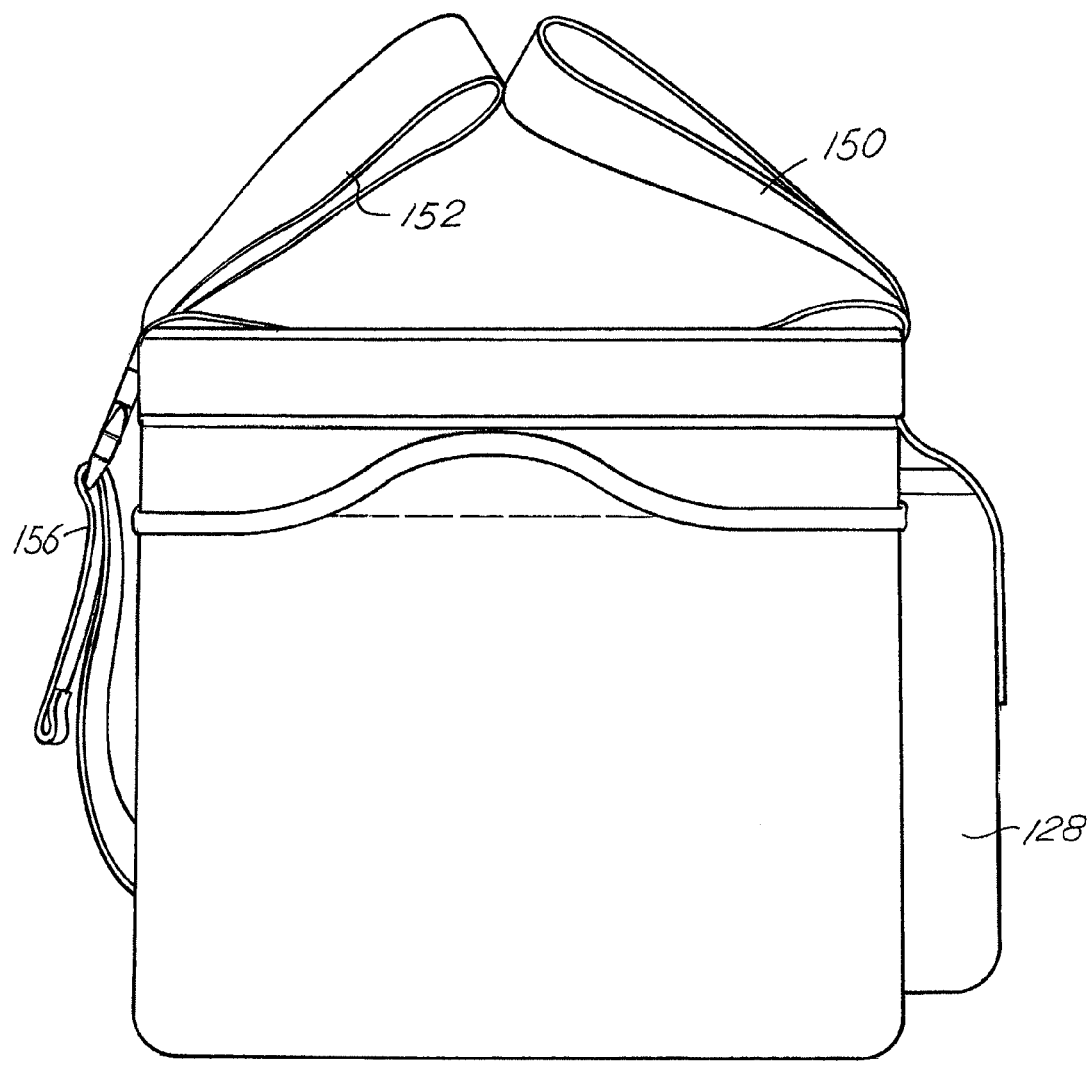
FIG. 6 is a first side elevation of the bag of FIG. 5.
Figure 7:
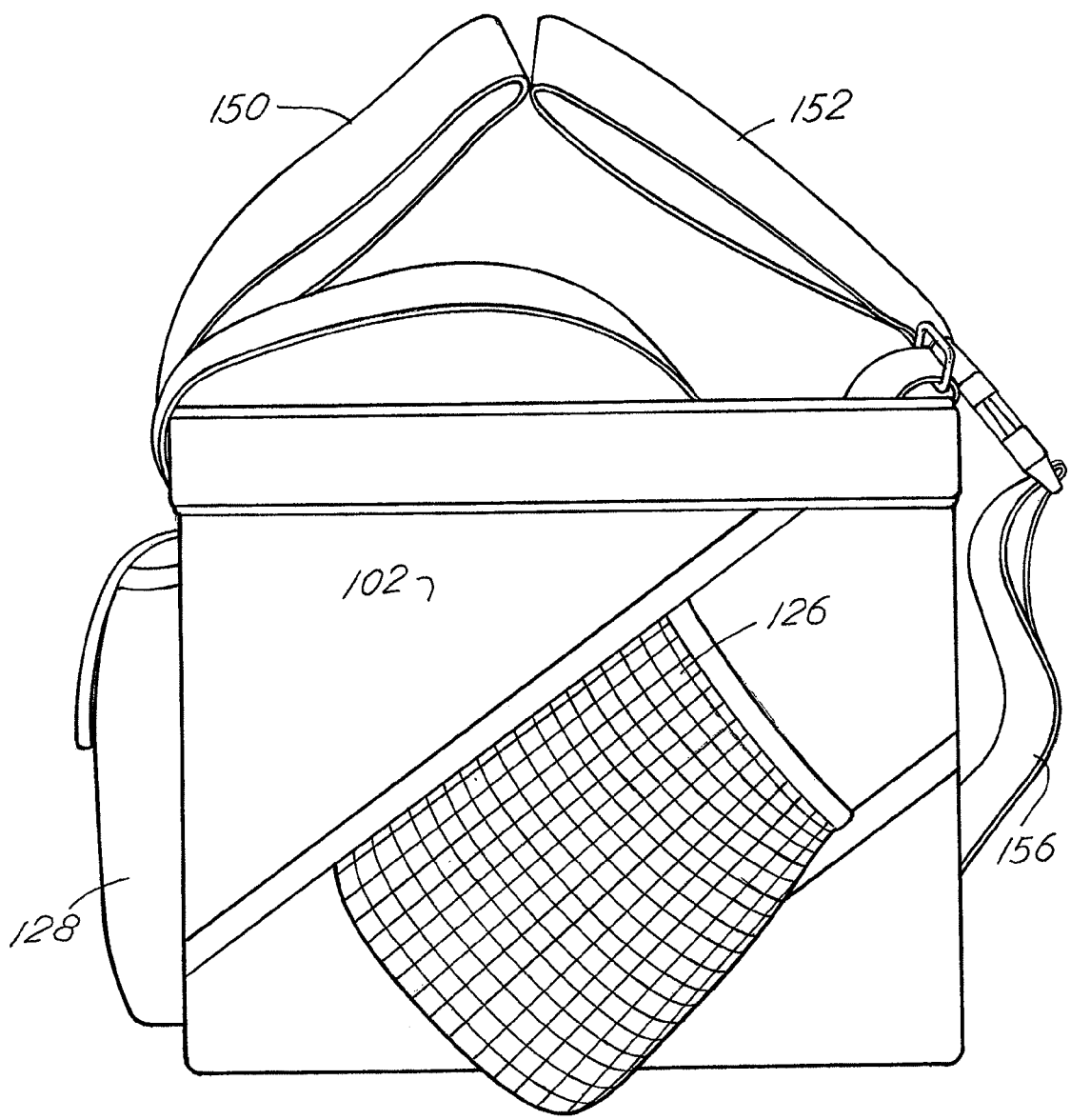
FIG. 7 is a side elevation of the bag opposite that of FIG. 6.
Figure 8:
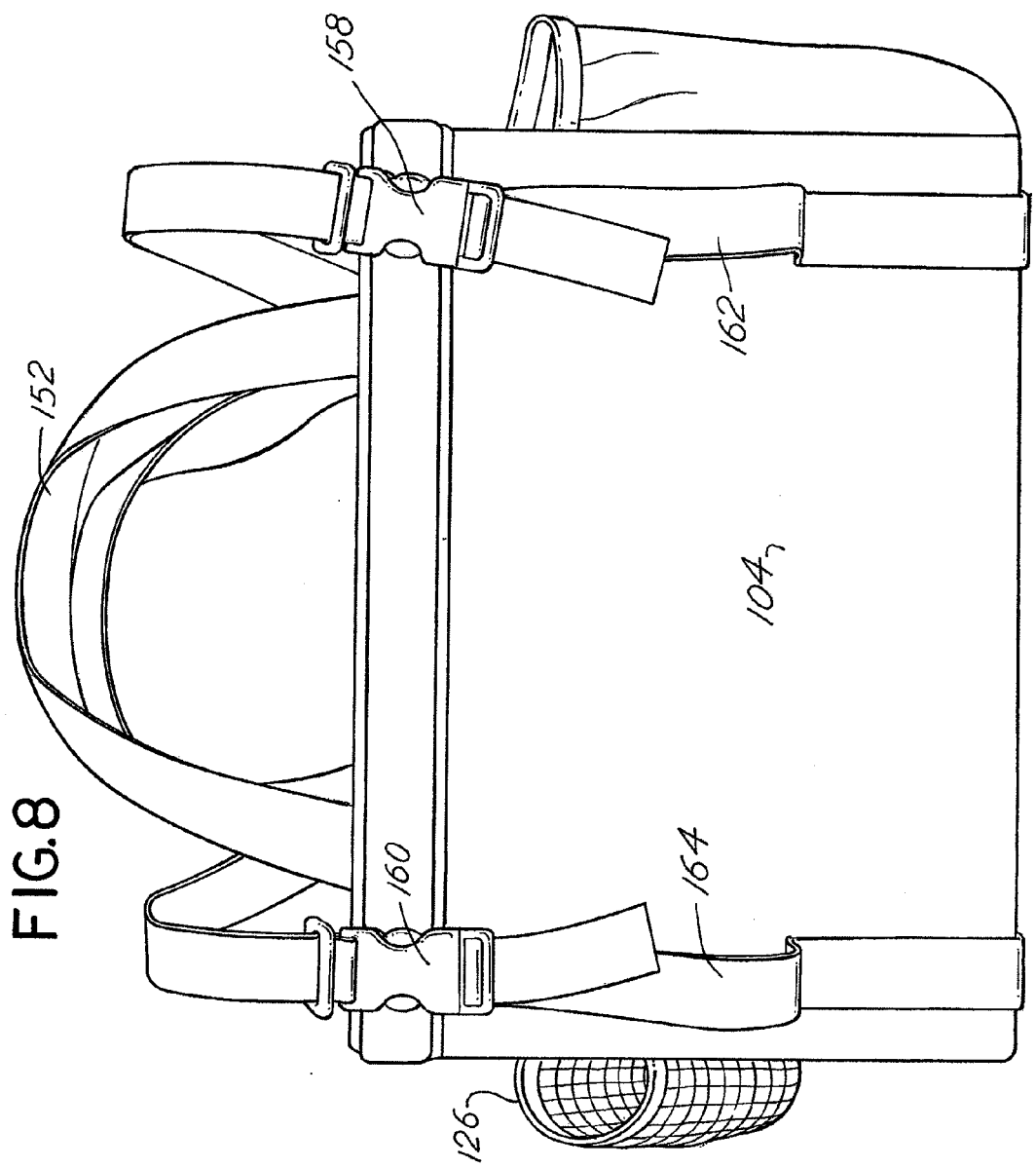
FIG. 8 is a backside elevation of the bag of FIG. 5.
Figure 9:
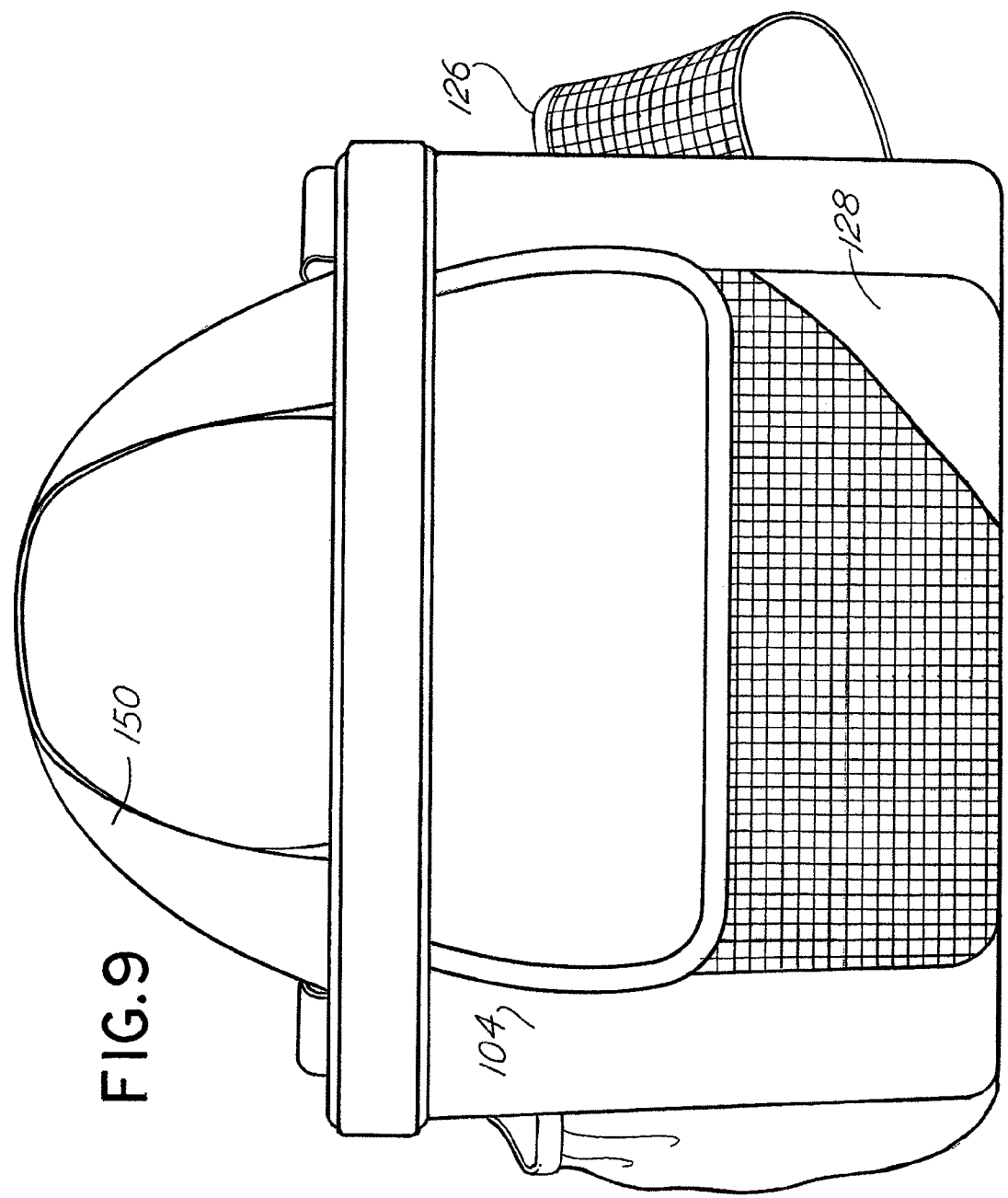
FIG. 9 is a front side elevation of the bag of FIG. 5.
Figure 10:
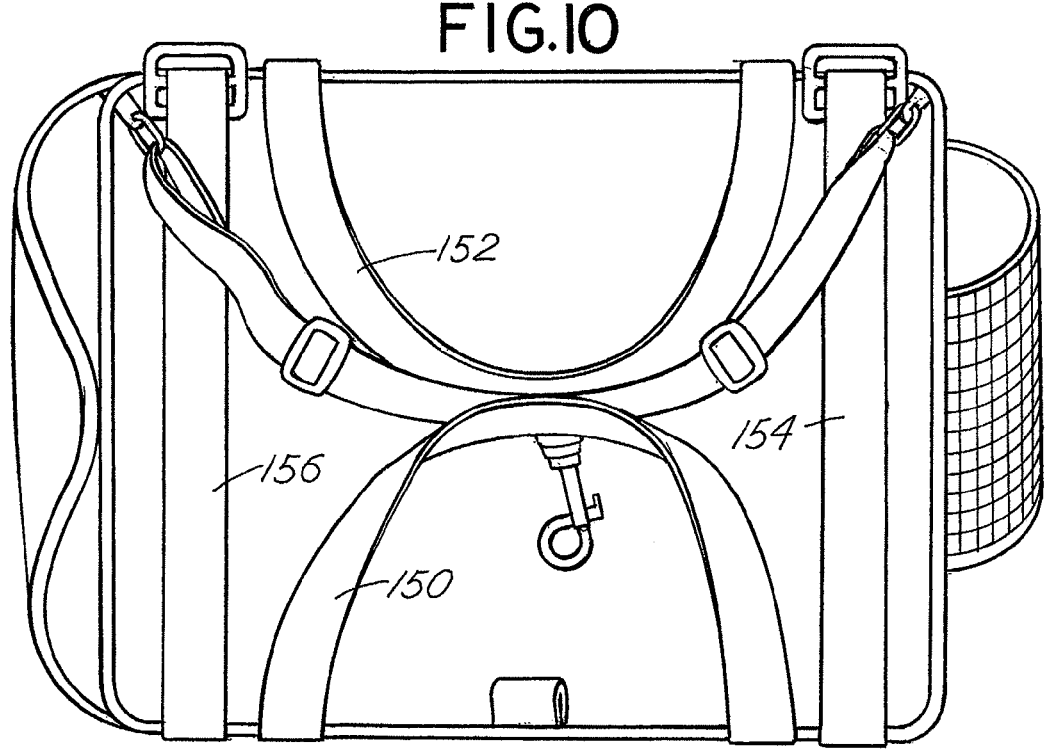
FIG. 10 is a top plan view of the bag of FIG. 5.
Figure 12:
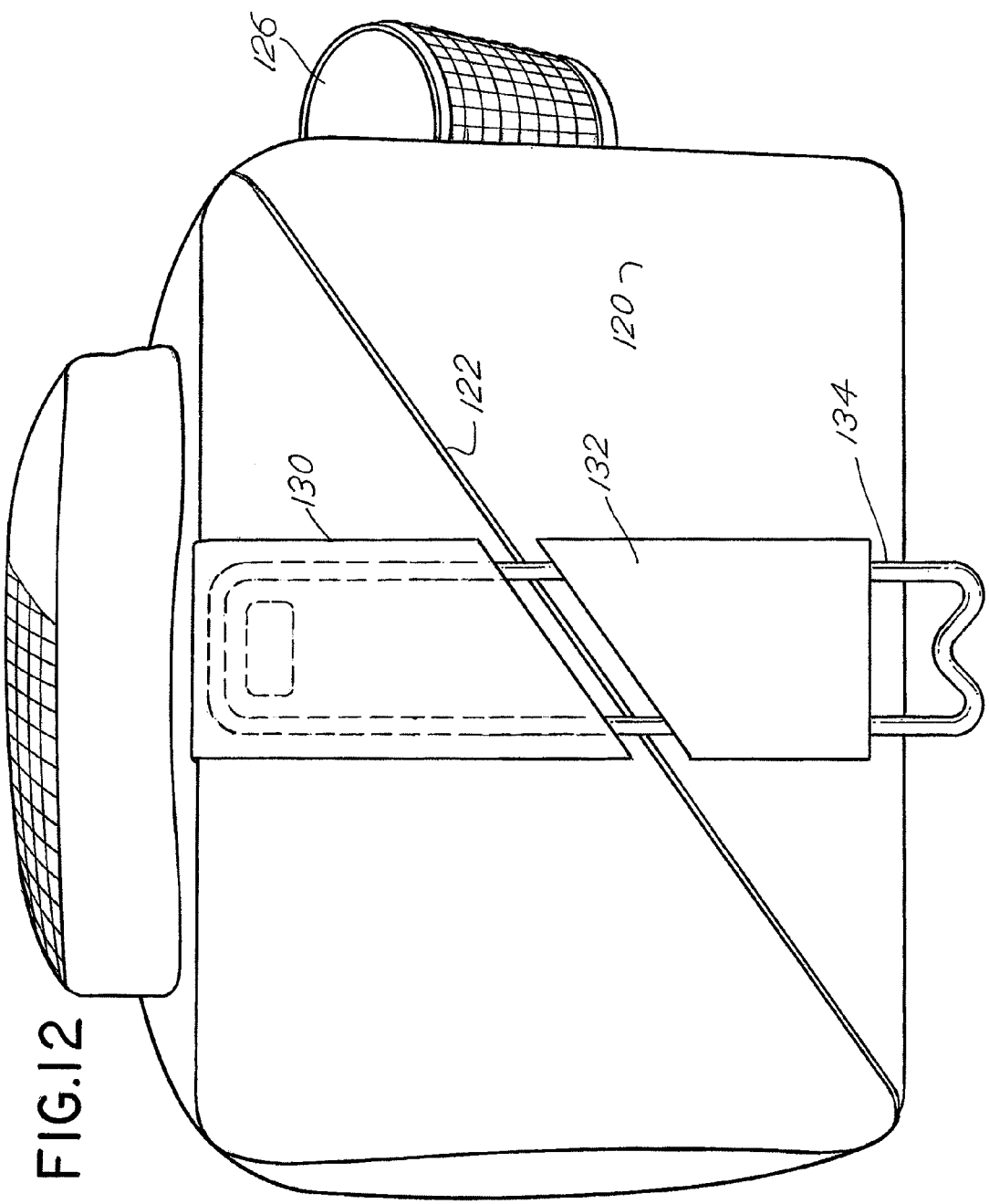
FIG. 12 is a bottom plan view similar to FIG. 11 depicting the construction of a stiffening element associated with the bottom panel or bottom side of the bag of FIG. 5.
Figure 13:
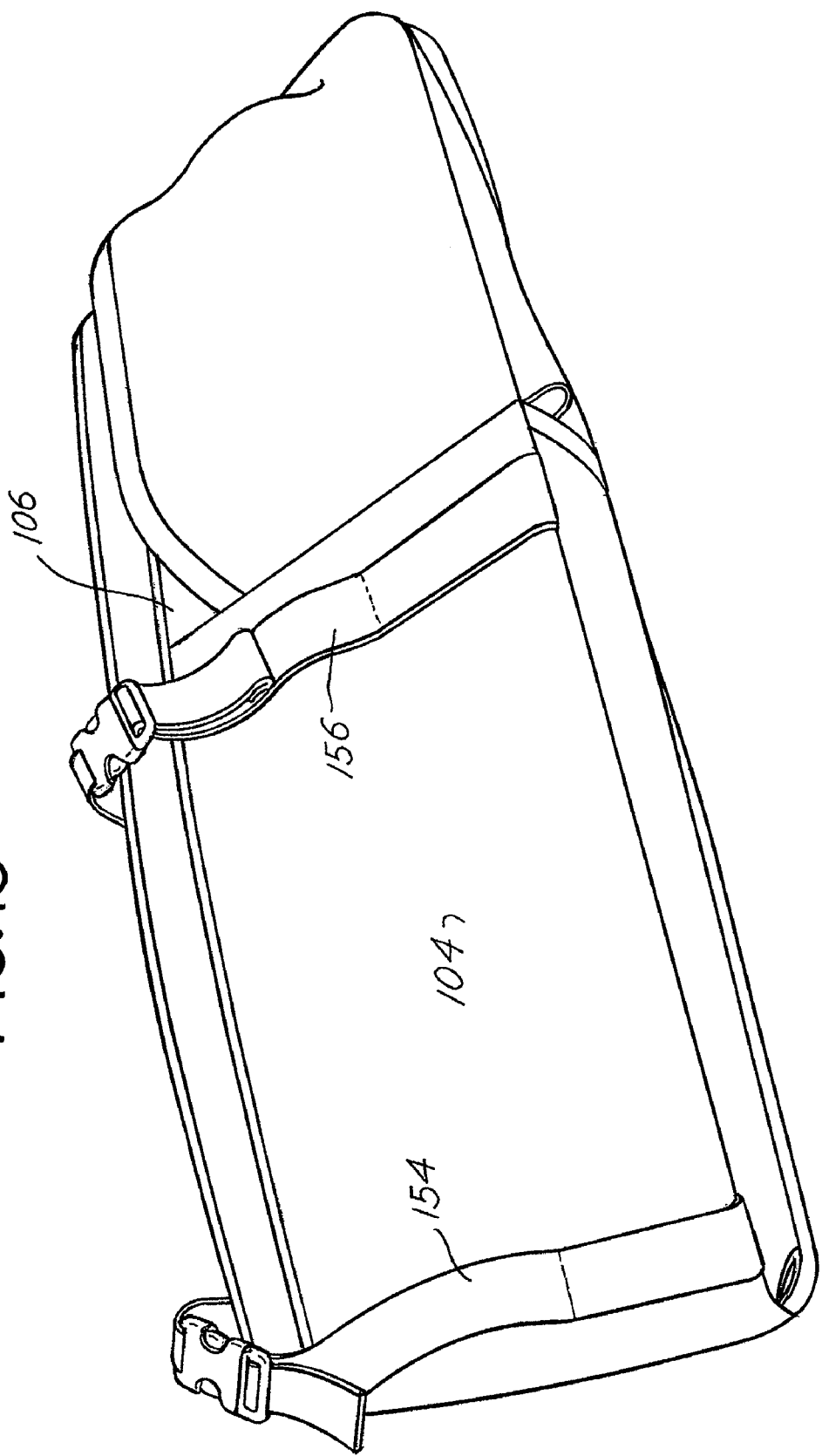
FIG. 13 is an isometric view of the bag of FIG. 5 in a folded condition as viewed from the backside and one lateral side.
Figure 14:
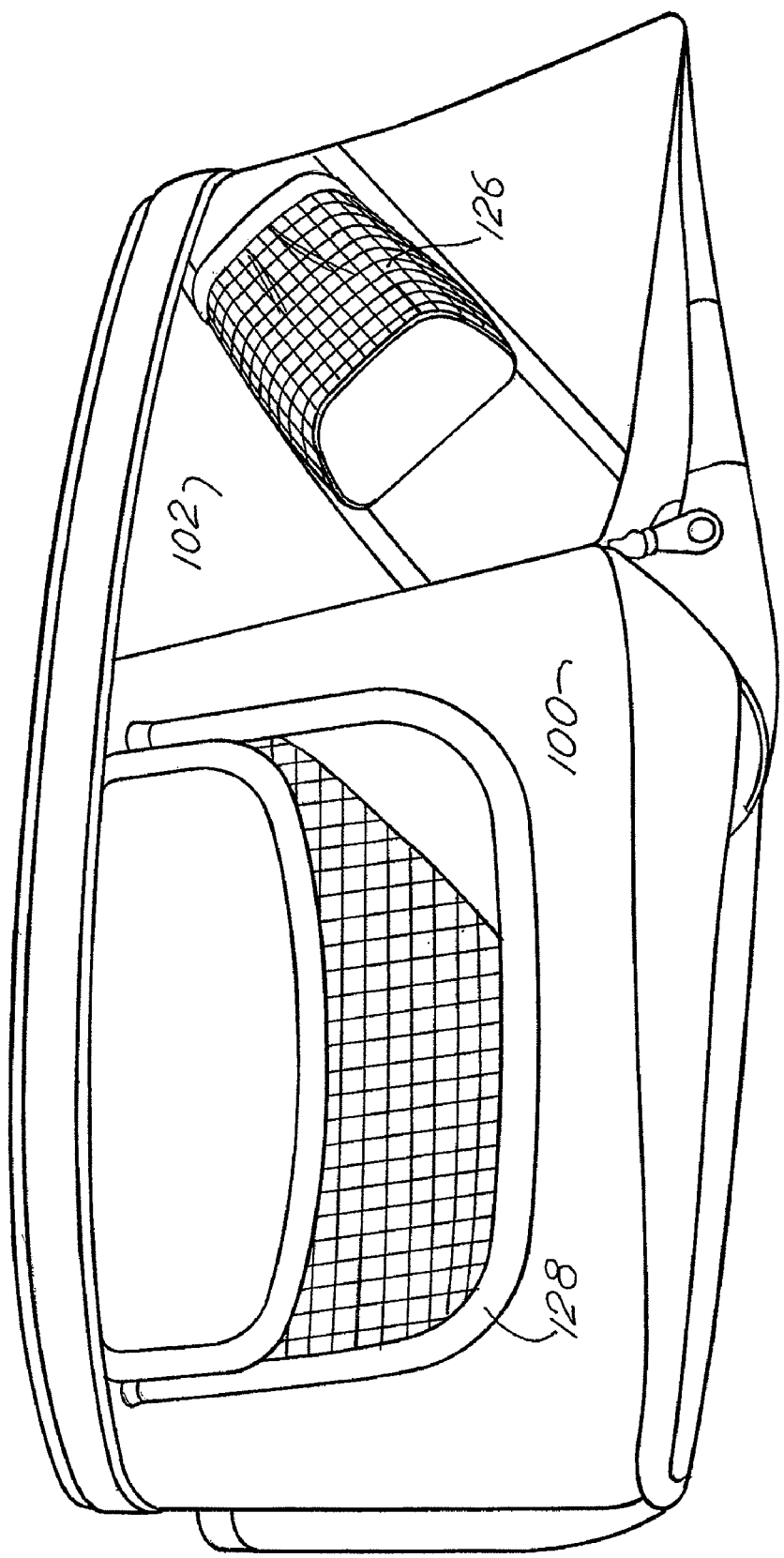
FIG. 14 is an isometric view of the bag of FIG. 5 in the folded condition depicting the front side and opposite lateral side thereof.

In the embodiment shown in FIGS. 5-19 a further stiffening element is provided for the bottom panel 120. More particularly, a pocket 130 is formed and attached to the bottom panel 120 on one side of slit 122. The pocket 130 cooperates with a secondary pocket 132 on the opposite side of the slit 122 so that a stiffening rod 134 may be inserted into the pockets 130 and 132, for example, as depicted in FIG. 12 to facilitate stiffening the bottom panel 120 and thus maintaining the shape of the bag or carrier. The particular configuration of the pocket 130 and the pocket 132 as well as the reinforcing bar 134 may be varied. Importantly, the stiffening element or bar or rod 134 fits over the slit or seam 122 to thereby maintain the relative alignment of the slit 122 and thus effectively stiffen the bottom panel 120. As shown in FIG. 6, storage pocket 128 may be incorporated on the outside of the side panel 106.

Figure 17:
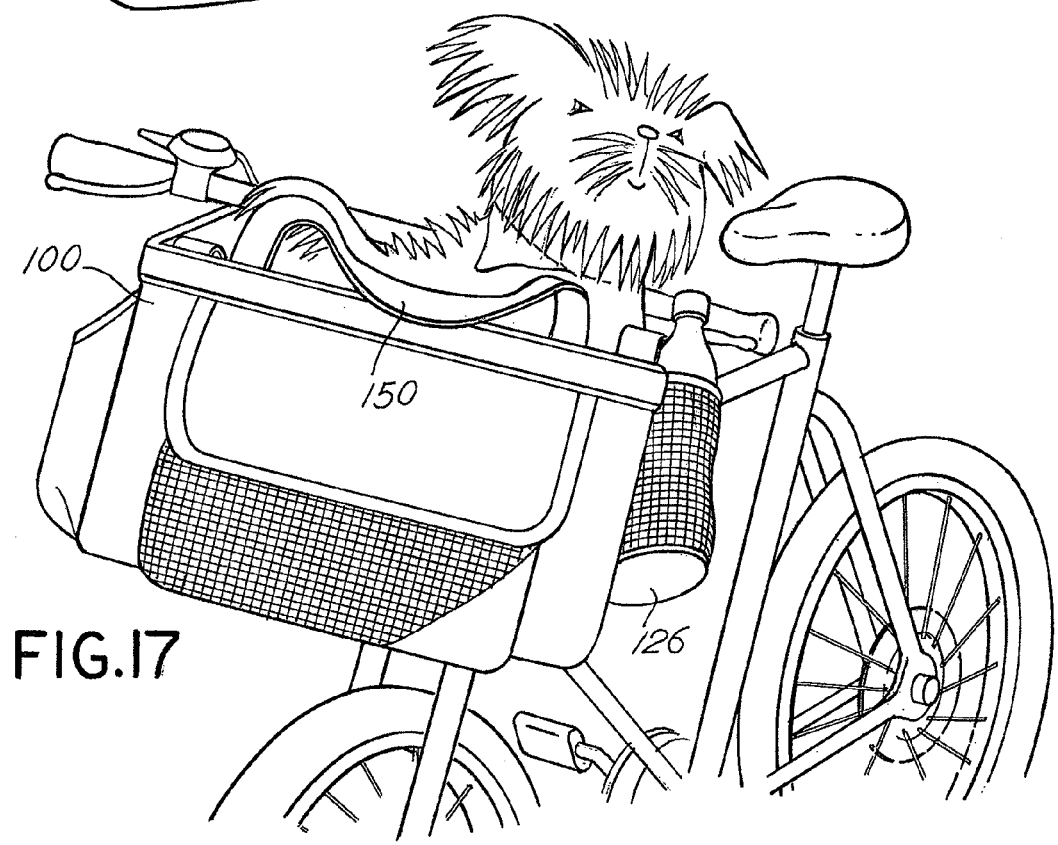
FIG. 17 is an isometric view illustrating the manner of utilization of the embodiment of FIG. 5 as supported on the handlebar of a bicycle.
Figure 18:
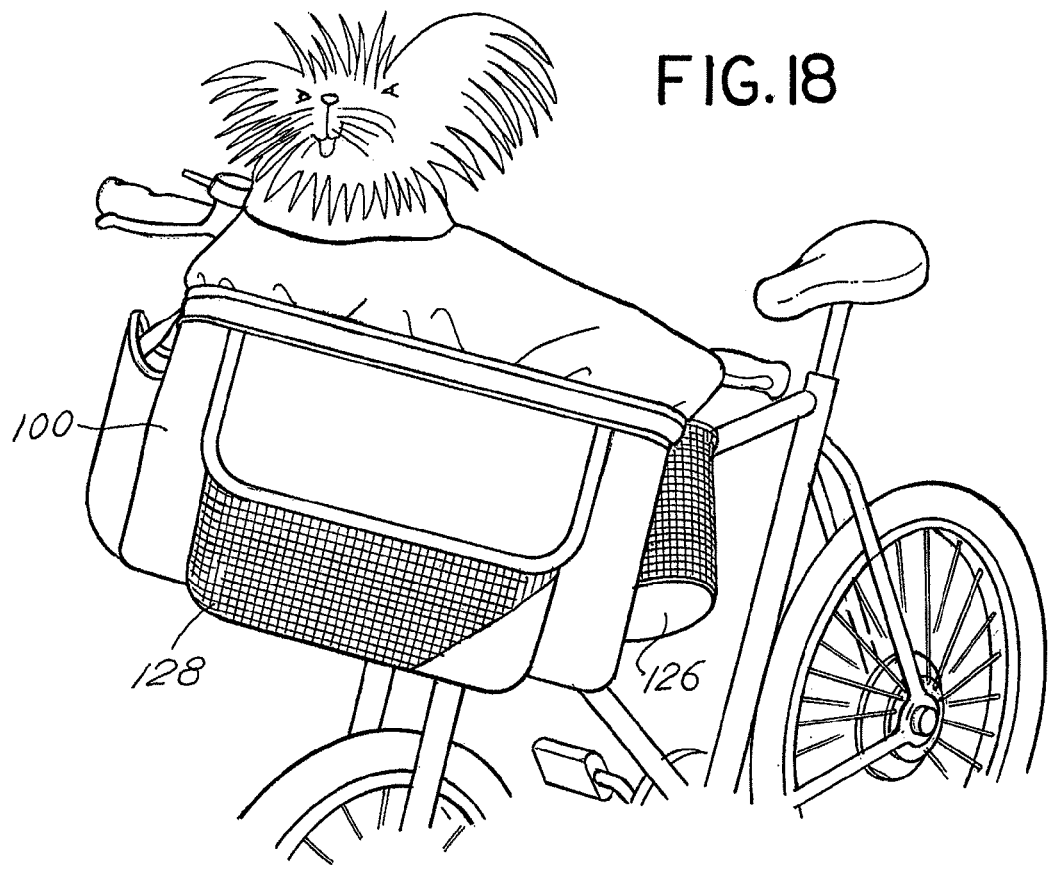
FIG. 18 is another isometric view depicting the embodiment of FIG. 15.
Figure 19:
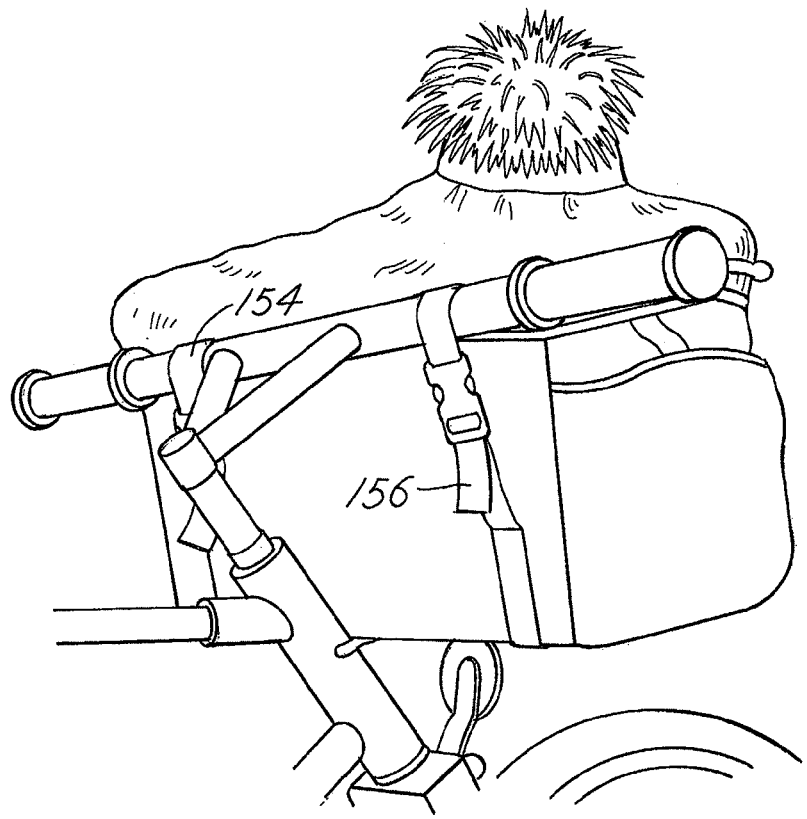
FIG. 19 is an isometric view illustrating the manner in which the embodiment of FIG. 5 is suspended from the handlebar of a bicycle.

The bag carrier of FIGS. 5-19 further includes a first handle 150 and a second handle 152 attached along the top side of the open top carrier to facilitate ease of carrying the bag and its contents. Further, the bag includes a first bar attachment strap 154 and a second bar attachment strap 156 for attaching the bag to a handlebar. The straps 154 and 156 are adjustable in length and connect from the front panel 100 through a buckle 155 and 157, respectively, to an adjustable length buckle 158 and 160 that connect with straps 162 and 164 on the backside panel 104. The described straps including the straps 152, 154, 162, and 164 may be fitted over a handle bar of a bike, for example, as depicted in FIGS. 17, 18, and 19 to support the bag thereon. The adjustability of the various straps enables proper positioning of the bag or carrier on the handlebar.

Figure 15:
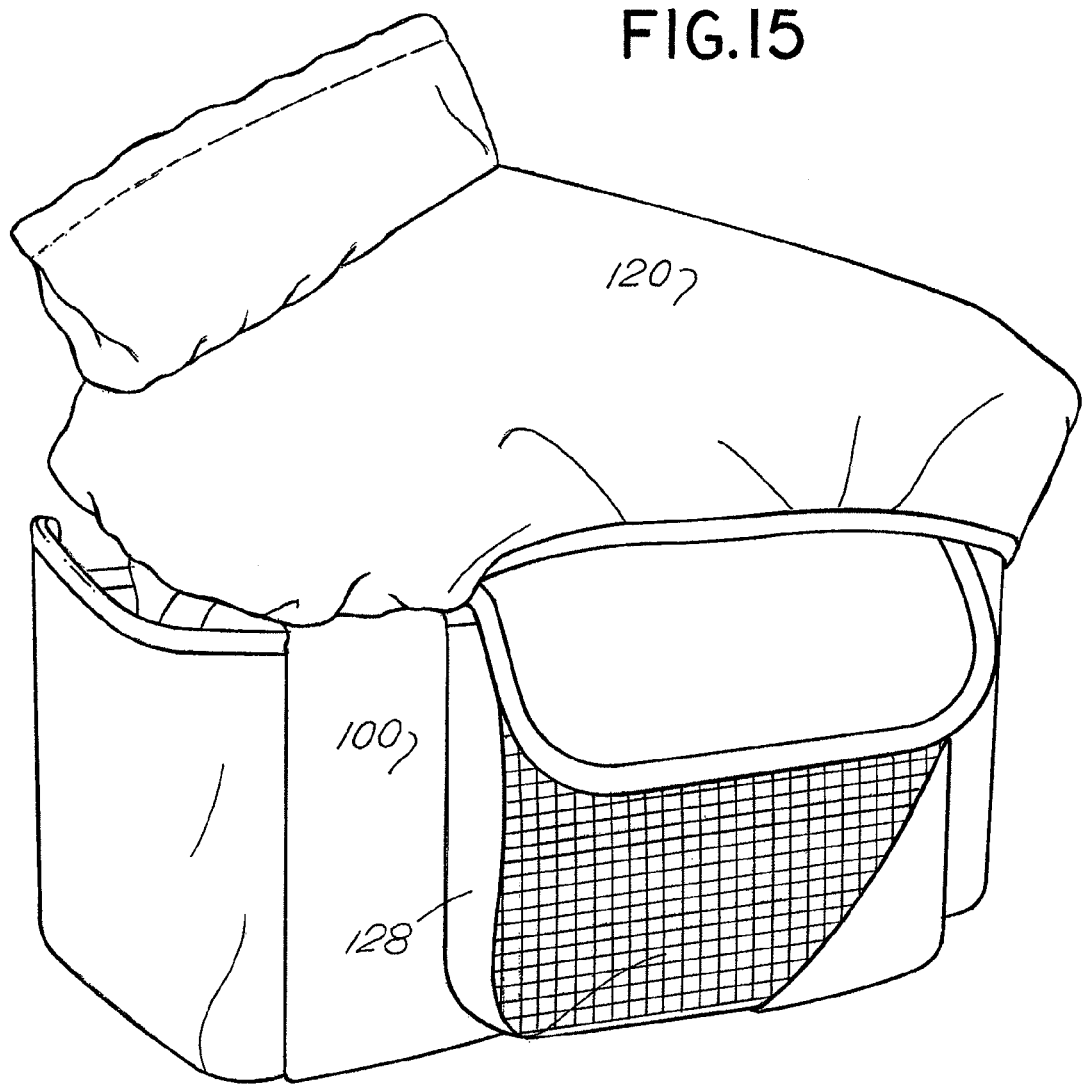
FIG. 15 is an isometric view of the embodiment of FIG. 5 further incorporating a cover or sleeve for a pet retained within the bag carrier.
Figure 16:
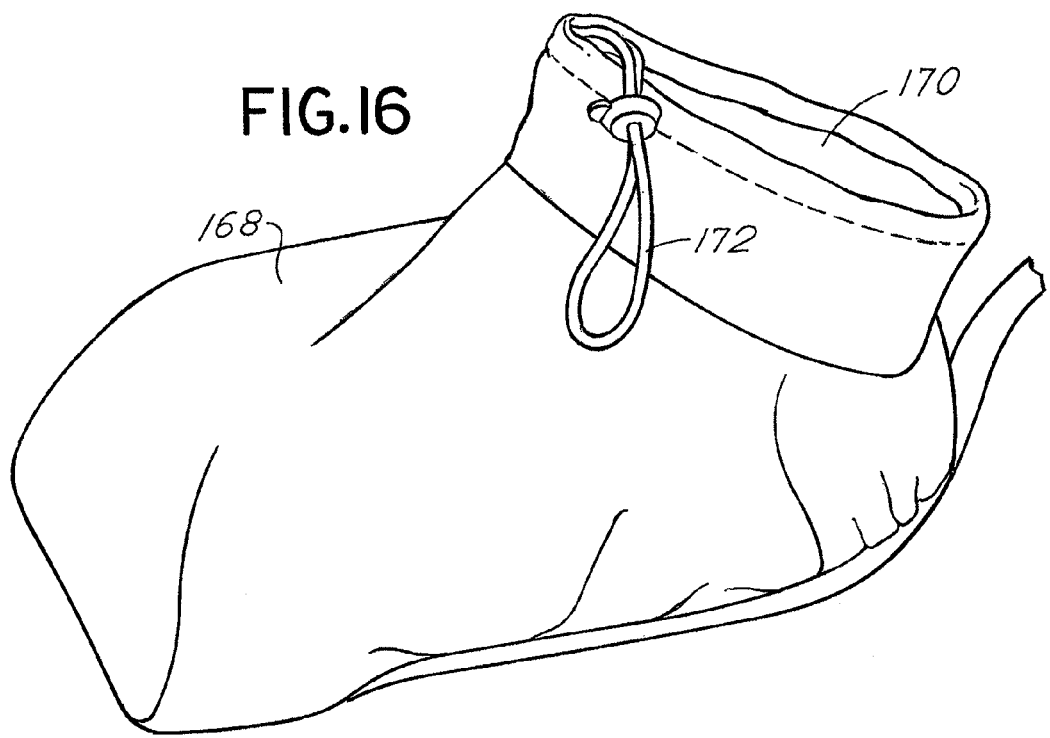
FIG. 16 is an enlarged isometric view of the cover or sleeve depicted in FIG. 15.

As shown in FIGS. 15 and 16, the carrier bag may include a sleeve or pouch 168 fastened on the inside of the bag to provide a protective coat to warm and retain an animal within the carrier bag. FIG. 16 depicts the pouch 168 which includes an opening 170 with an adjustable lanyard 172. The head of the dog as depicted, for example, in FIG. 18, fits through opening 170.

The various side panels 100, 102, 104 and 106 may also be made from a stiff fabric material or a fabric material that encases a semi-stiff polyethylene board, for example, which facilitates maintaining the structural shape and configuration of the bag as it moves between its folded and unfolded condition. Thus, as with the first embodiment of the invention, there is provided a means for stiffening a bottom panel which is otherwise flexible so that the bottom panel may be stiffened when the bag is in its full, open condition, but which enables it to be flexible when folded for purposes of storage, for example. The side panels or sides of the bag, however, may be stiff or semi-stiff or include elements therein rendering the sides stiff or semi-stiff. A buckle and strap arrangement is provided for mounting the bag on the handlebar of a bicycle, for example, or otherwise mounting the open bag. Various means are disclosed for stiffening the bottom panel when desired in order to maintain the shape of the bag.

The invention has been described in the context of a generally rectangular parallelepiped structure. It is possible to alter the construction somewhat to other geometric configurations while maintaining the integrity and features of the invention. Thus, while there has been set forth a preferred embodiment of the invention, it is to be understood that the invention is limited only by the following claims and equivalents thereof.

What is claimed is:

1. A folding bag comprising, in combination:
a generally rectangular parallelepiped container having at least five sides including a flexible material, generally rectangular bottom side having four corners, a front side, a back side spaced from the front side, a first lateral end side and a second lateral end side spaced from the first end side, said sides joined by flexible junctures to enable said lateral, front and back sides to be folded relative to each other, said bottom side including a diagonal slit extending generally between non-adjacent corners and a material connection device for joining the sides of the slit; and
a reinforcing member cooperative with the bottom side to maintain the bottom side in a substantially rigid condition, said reinforcing member removable from cooperation with the bottom side to enable collapsible folding of the bag.

2. The bag of claim 1 wherein the material connecting device in the bottom side comprises a zipper.

3. The bag of claim 1 wherein at least one of said front side, back side, first end side and second end side is generally a rigid side.

4. The bag of claim 1 wherein said front side, back side, first end side and second end side are generally rigid.

5. The bag of claim 1 further including a top side attached by a flexible hinge to one of the sides.

6. The bag of claim 1 further including a top side attached by a flexible hinge to the backside.

7. The bag of claim 6 including a latching device for attaching the top side to the front side.

8. The bag of claim 1 wherein the reinforcing member comprises a rigid panel attached by a flexible hinge to the seam between the bottom side and another side.

9. The bag of claim 8 wherein the rigid panel comprises a panel member encased within a fabric sleeve.

10. The bag of claim 1 in the form of a carrier for a pet, said bag including said back side with at least one attachment strap for suspending said bag from a bar.

11. The bag of claim 1 wherein the front side, back side, and lateral sides include stiffening elements, and further wherein said back side includes at least one attachment strap for suspending said bag from a bar.

12. The bag of claim 1 further including at least one handle attached to a side for carrying said bag.

13. The bag of claim 1 further including a cover within the bag attached to the inside of at least one side.

14. The bag of claim 1 further including at least one storage pocket attached to at least one side of the bag.

15. A folding bag comprising, in combination:
a generally rectangular parallelepiped container having at least five sides including a flexible material, generally rectangular bottom side having four corners, a front side, a back side spaced from the front side, a first lateral end side and a second lateral end side spaced from the first end side, said sides joined by flexible junctures to enable said lateral, front and back sides to be folded relative to each other, said bottom side including a diagonal slit extending generally between non-adjacent corners and a material connection device for joining the sides of the slit; and
a generally rigid reinforcing member attachable to the bottom side to maintain the bottom side configured in a rectangular shape, and said reinforcing member disengageable to enable collapsible folding of the bag.

16. The bag of claim 15 wherein the bottom side includes a pocket for receipt of the reinforcing member.

17. The bag of claim 15 wherein the bottom side includes a receiving element for receipt and retention of the reinforcing member.

18. The bag of claim 15 wherein the reinforcing member extends across the slit during maintenance in the configured shape of the bottom side.

19. The bag of claim 15 wherein the material connecting device in the bottom side comprises a zipper.

20. The bag of claim 15 wherein at least one of said front side, back side, first end side and second end side is generally a rigid side.

21. The bag of claim 15 wherein said front side, back side, first end side and second end side are generally rigid.

22. The bag of claim 15 further including a top side attached by a flexible hinge to one of the sides.

* * * * *